US012181820B2

(12) United States Patent
Yokota et al.

(10) Patent No.: US 12,181,820 B2
(45) Date of Patent: Dec. 31, 2024

(54) FIXING DEVICE AND IMAGE FORMING APPARATUS

(71) Applicant: CANON KABUSHIKI KAISHA, Tokyo (JP)

(72) Inventors: Akinori Yokota, Tokyo (JP); Osamu Sasaoka, Kanagawa (JP); Tsuguhiro Yoshida, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/333,754

(22) Filed: Jun. 13, 2023

(65) Prior Publication Data

US 2024/0069476 A1 Feb. 29, 2024

(30) Foreign Application Priority Data

Aug. 31, 2022 (JP) ................................ 2022-138176

(51) Int. Cl.
*G03G 15/20* (2006.01)

(52) U.S. Cl.
CPC ..... *G03G 15/2053* (2013.01); *G03G 15/2064* (2013.01); *G03G 2215/2038* (2013.01)

(58) Field of Classification Search
CPC ........... G03G 15/2053; G03G 15/2064; G03G 2215/2038
See application file for complete search history.

(56) References Cited

U.S. PATENT DOCUMENTS 8,938,173 B2 1/2015 Sasaoka ................. G03G 15/00
10,838,336 B2 11/2020 Yoshida et al. ........ G03G 15/20
10,921,737 B2 2/2021 Sato et al. ............. G03G 15/20
11,003,118 B2 5/2021 Yoshida et al. ........ G03G 15/20
11,073,778 B2 7/2021 Doda et al. ............ G03G 15/20
11,092,916 B2 8/2021 Yoshida et al. ........ G03G 15/20
11,194,272 B2 12/2021 Doda et al. ............ G03G 15/20
11,281,135 B2 3/2022 Sato et al. ............. G03G 15/20
11,281,139 B2 3/2022 Doda et al. ............ G03G 15/20
11,442,385 B2 9/2022 Doda et al. ............ G03G 15/20
11,507,001 B2 11/2022 Yoshida et al. ........ G03G 15/20
11,579,550 B2 2/2023 Nakamoto et al. .... G03G 15/20
11,669,032 B2 6/2023 Doda et al. ............ G03G 15/20
2005/0163540 A1 7/2005 Umezawa et al. ............ 399/328
2017/0023897 A1* 1/2017 Sakurai .............. G03G 15/2053
2019/0004459 A1* 1/2019 Sekiyama .......... G03G 15/2053
2022/0253006 A1 8/2022 Doda et al. ............ G03G 15/20
2022/0299912 A1 9/2022 Yoshida et al. ........ G03G 15/20
2022/0390882 A1 12/2022 Doda et al. ............ G03G 15/20
2023/0065569 A1 3/2023 Wakatsu et al. ....... G03G 15/20
2023/0067803 A1 3/2023 Yoshida et al. ........ G03G 15/20
2023/0259057 A1 8/2023 Doda et al. ............ G03G 15/20

* cited by examiner

*Primary Examiner* — Sophia S Chen
(74) *Attorney, Agent, or Firm* — Venable LLP

(57) ABSTRACT

A fixing device includes a cylindrical fixing member, a heater arranged in an inner space of the fixing member, a pressing member to contact the fixing member and a conductive member disposed so as to contact an inner surface of the fixing member and to conduct the fixing member to a circuit for controlling a potential of the fixing member The fixing member heats an image on a recording material to fix the image onto the recording material while nipping and conveying the recording material between the fixing member and the pressing member. The conductive member is formed of metal wire.

18 Claims, 13 Drawing Sheets

(a)

(b)

(a)

(b)

(c)

FIXING DEVICE AND IMAGE FORMING APPARATUS

FIELD OF THE INVENTION AND RELATED ART

The present invention relates to a fixing device for fixing an image on a recording material and an image forming apparatus for forming an image on the recording material.

In a fixing device which is used for an image forming apparatus which applies an electrophotographic method, etc. when a fixing member which contacts the recording material is charged, adverse effects such as a phenomenon in which an electric current flows from the fixing member via the recording material to a transfer portion and an electrostatic offset may be caused. U.S. Patent Application Pub. No. 2005/0163540 discloses a configuration in which a conductive member, in which a carbon tip as a contact point at a leading end of a metal plate with springiness is provided, is contacted with an inner surface of a fixing film, and the fixing film is grounded via the conductive member in a configuration in which the cylindrical fixing film is used.

In the configuration of the U.S. Patent Application Pub. No. 2005/0163540, when the fixing device is assembled, it is necessary to assemble the fixing film while pushing down the metal plate so that the conductive member which consists of the metal plate does not damage the fixing film. Further, in a case that an edge of the metal plate is sharp, the edge may damage the inner surface of the fixing film after assembled.

SUMMARY OF THE INVENTION

An object of the present invention is to provide a constitution that it is possible to reduce possibility in which a fixing member will be damaged.

According to an aspect of the present invention, there is provided a fixing device comprising, a cylindrical fixing member, a heater arranged in an inner space of the fixing member, a pressing member configured to contact the fixing member, and a conductive member disposed so as to contact an inner surface of the fixing member and configured to conduct the fixing member to a circuit for controlling a potential of the fixing member, wherein the fixing member heats an image on a recording material to fix the image onto the recording material while nipping and conveying the recording material between the fixing member and the pressing member, and wherein the conductive member is formed of metal wire.

Further features of the present invention will become apparent from the following description of exemplary embodiments with reference to the attached drawings.

Figure 3:
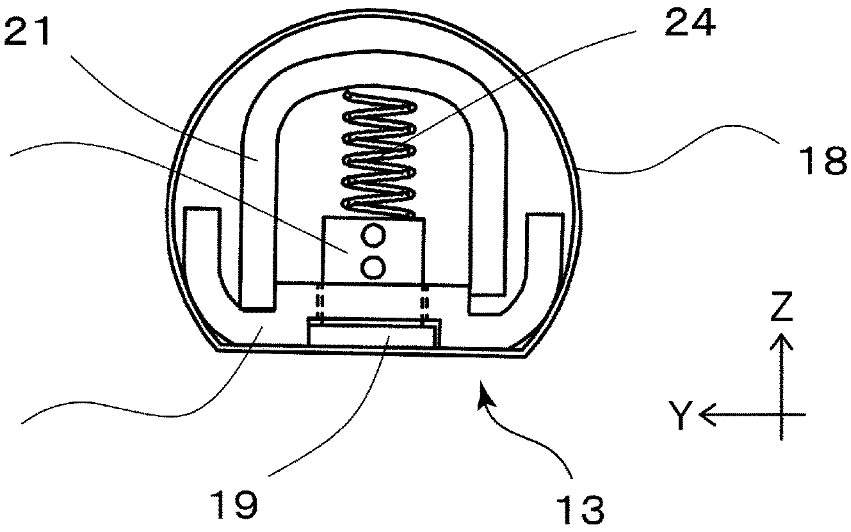
Figure 3:
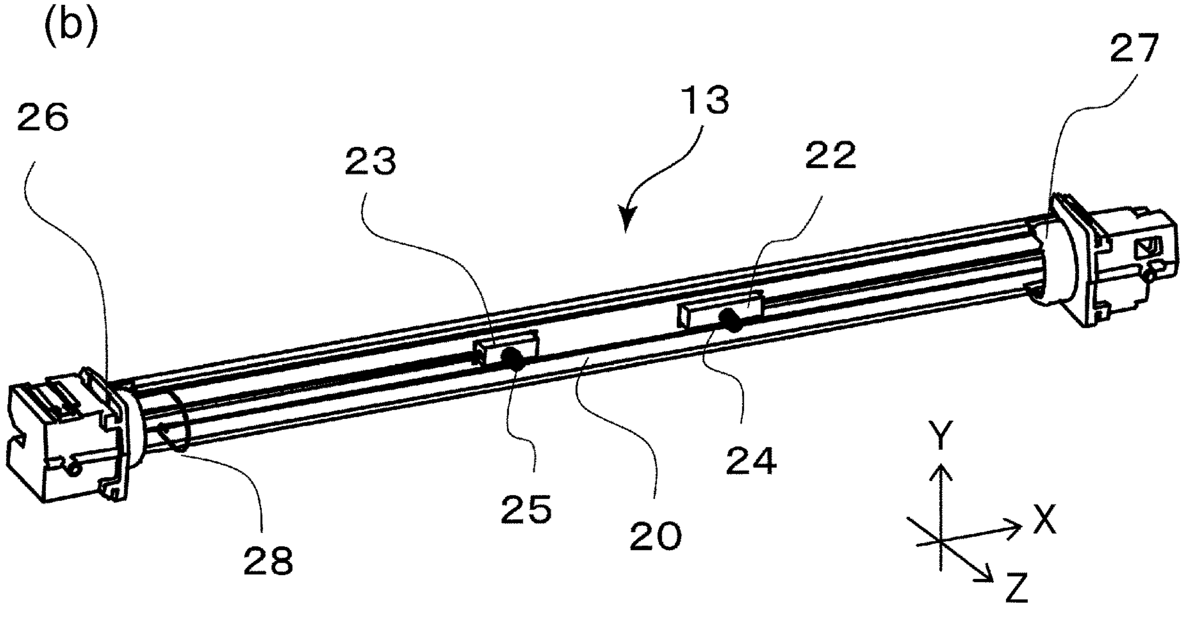

Part (a) and part (b) of FIG. 3 are views to illustrate the fixing device according to the first embodiment.

Figure 4:
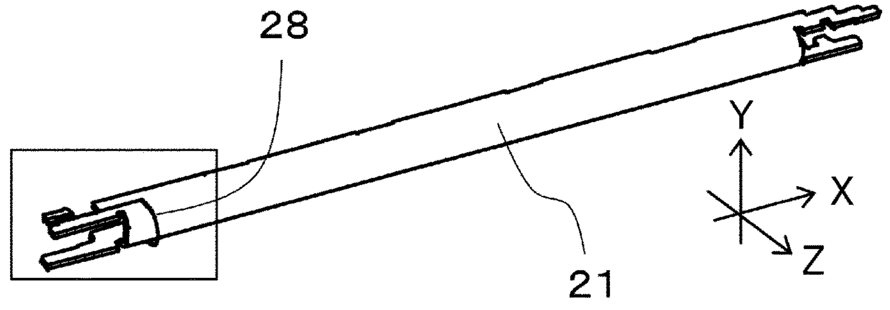
Figure 4:
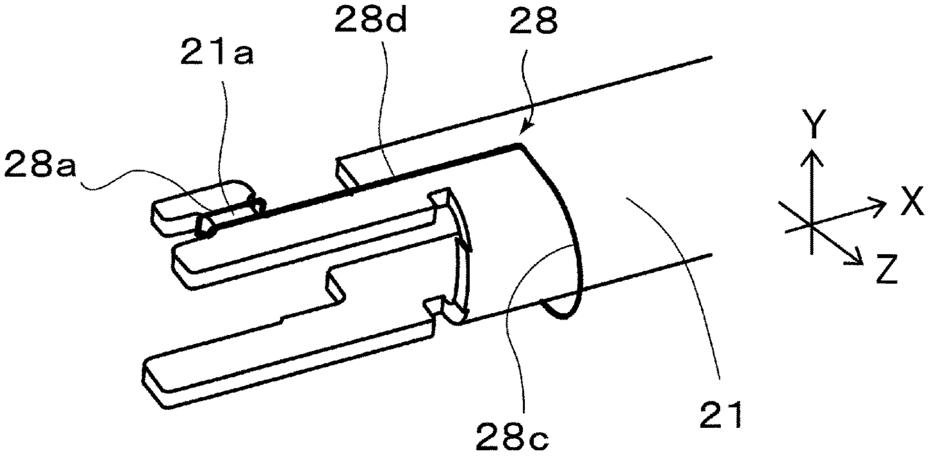
Figure 4:
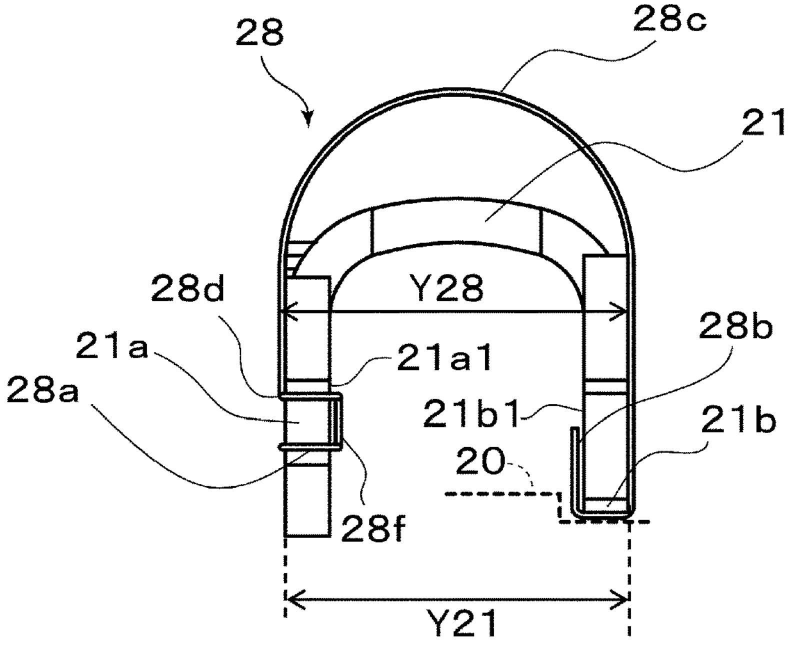

Part (a), part (b) and part (c) of FIG. 4 are views to illustrate a conductive wire according to the first embodiment.

Figure 5:
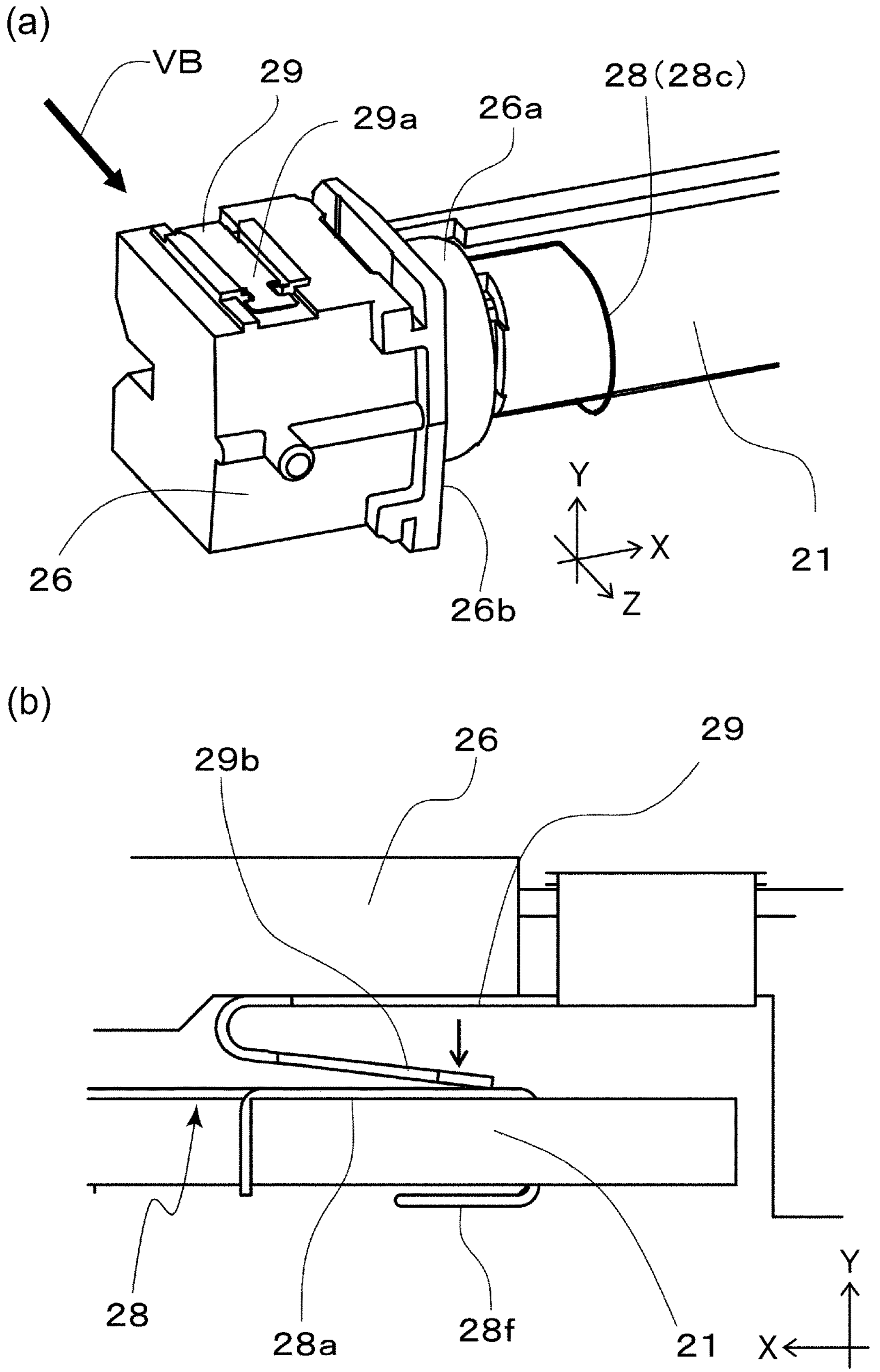

Part (a) and part (b) of FIG. 5 are views to illustrate the conductive wire according to the first embodiment.

Figure 6:
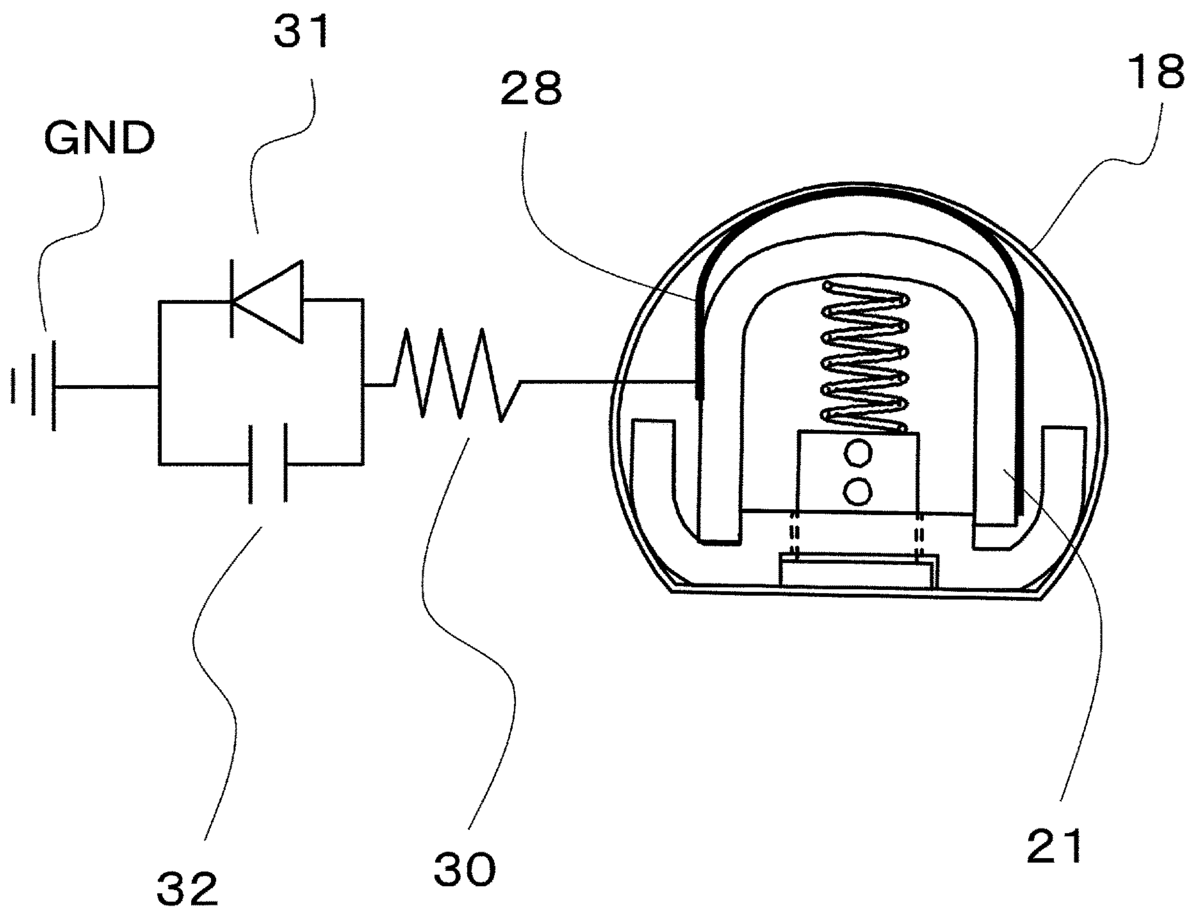

FIG. 6 is a view showing an electrical circuit between the fixing film and ground according to the first embodiment.

Figure 7:
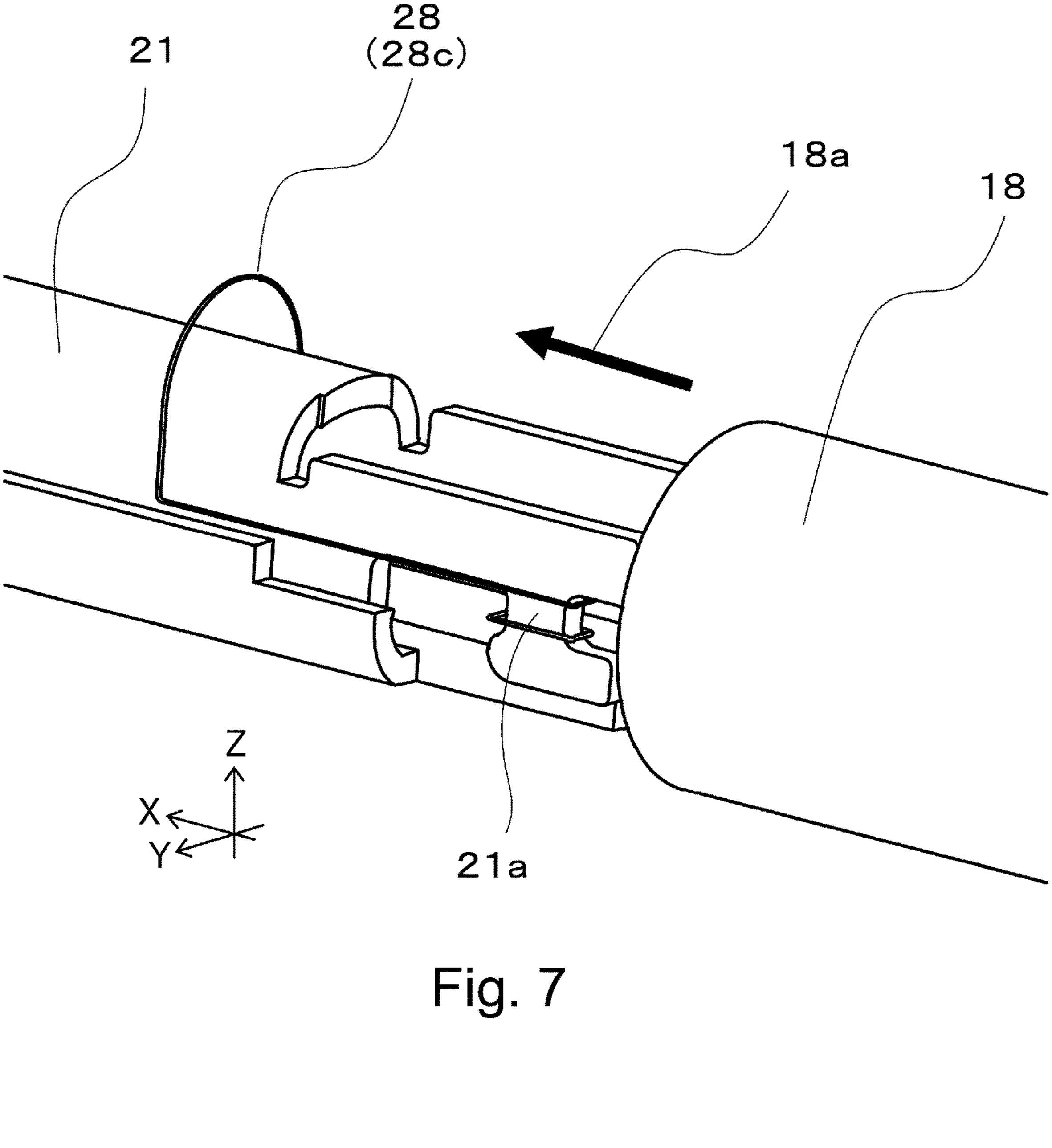

FIG. 7 is a view to illustrate the conductive wire according to the first embodiment.

Figure 8:
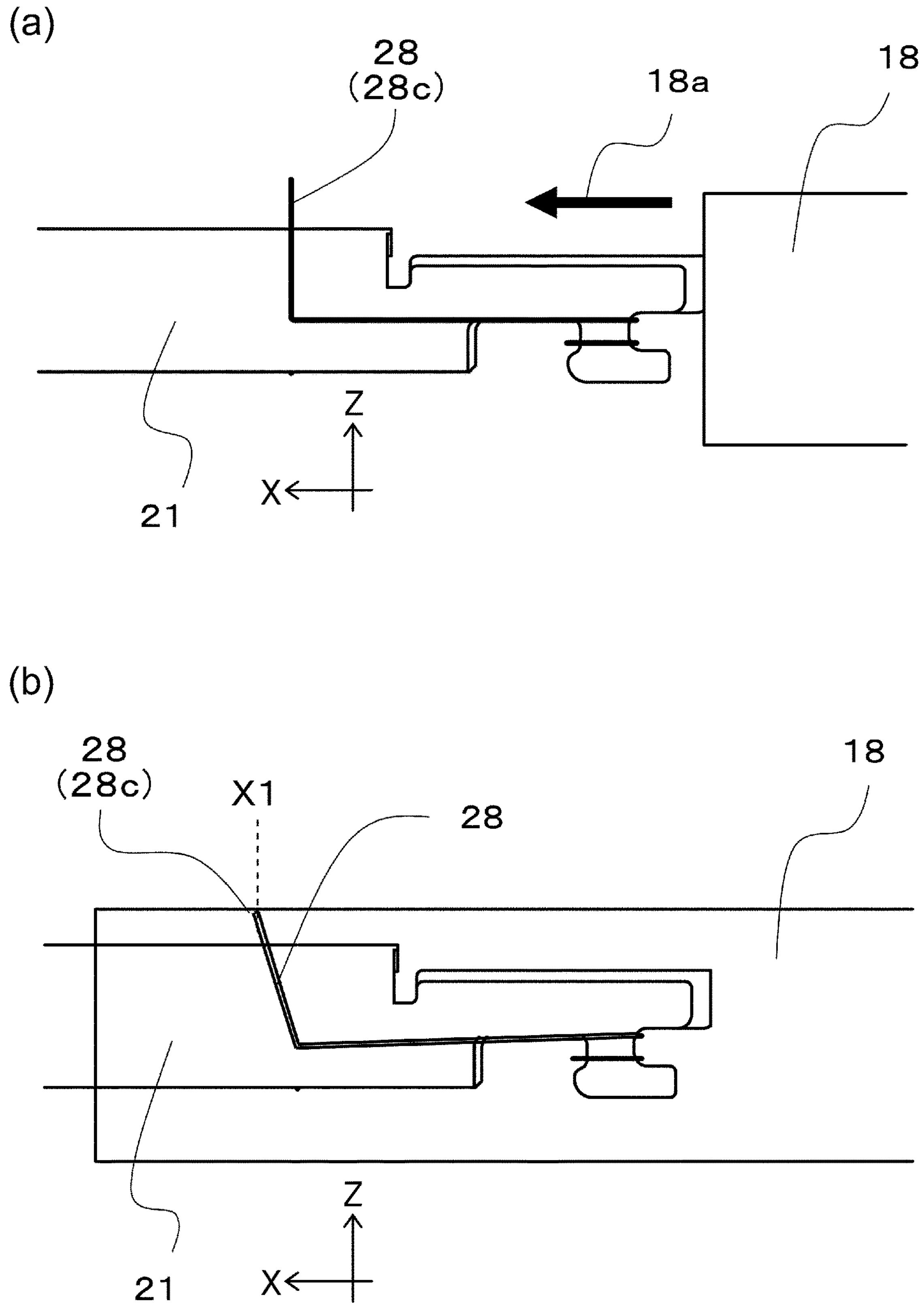

Part (a) and part (b) of FIG. 8 are views to illustrate the conductive wire according to the first embodiment.

Figure 9:
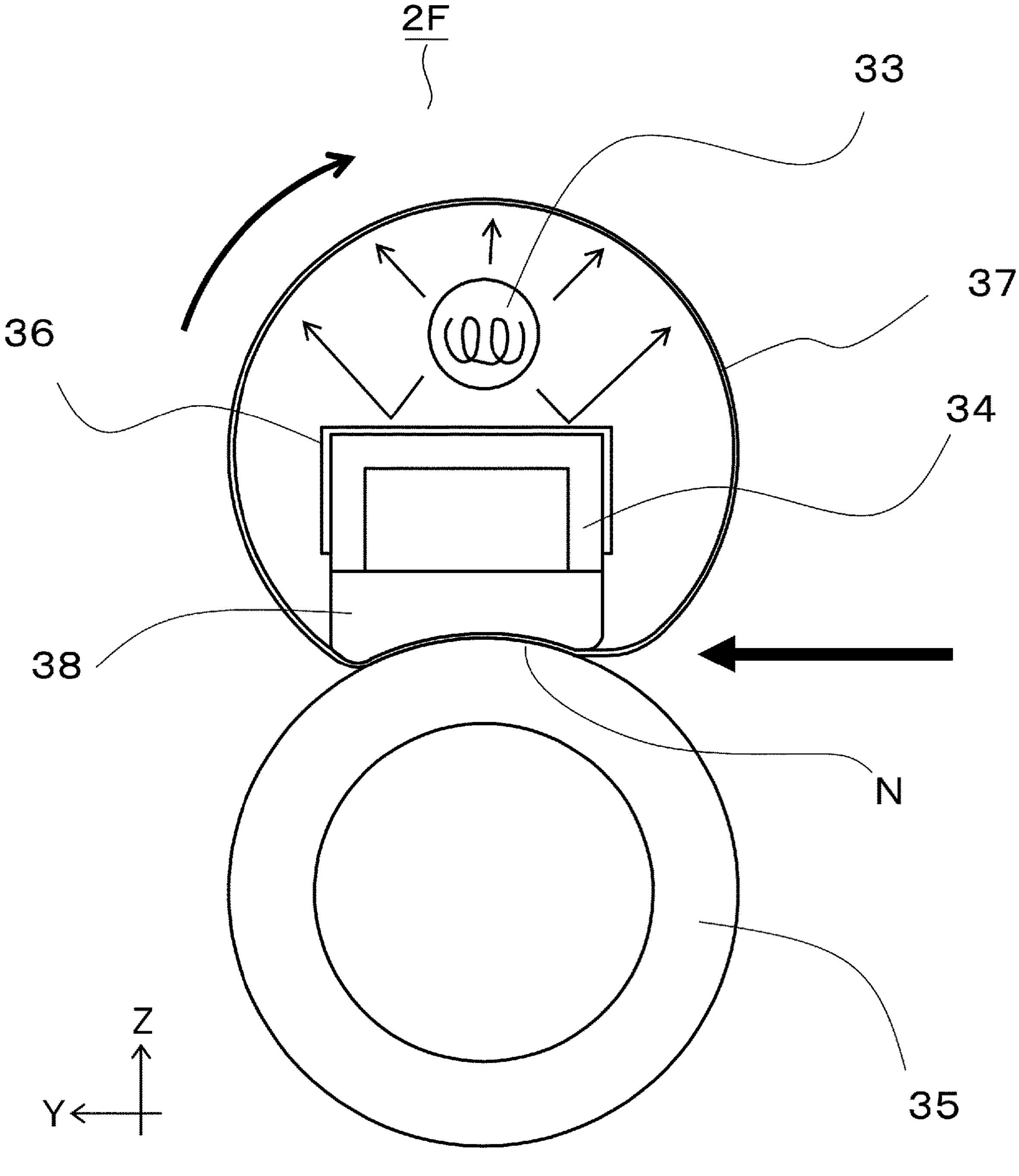

FIG. 9 is a schematic view showing a fixing device according to a second embodiment.

Figure 10:
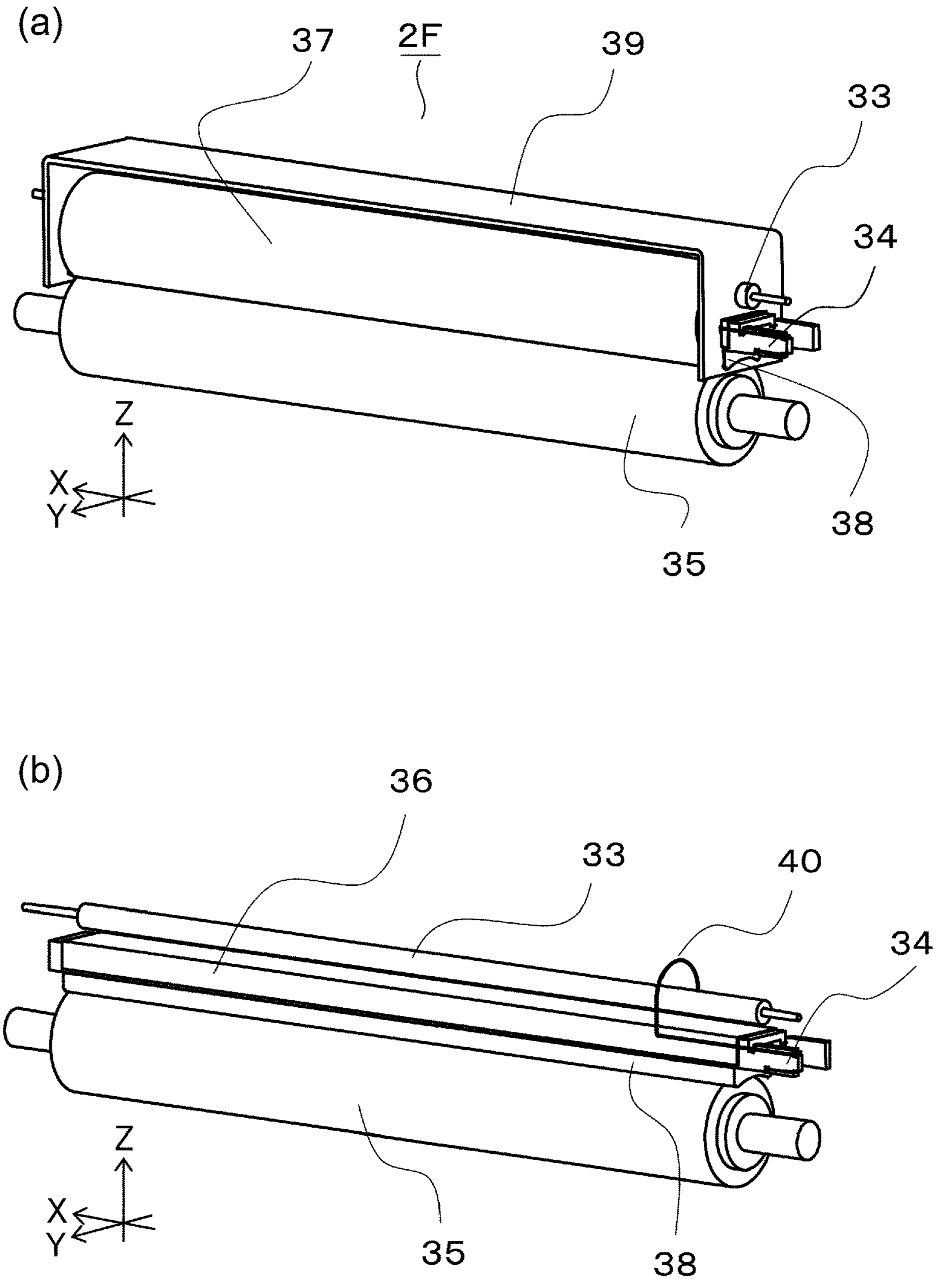

Part (a) and part (b) of FIG. 10 are views to illustrate the fixing device according to the second embodiment.

Figure 11:
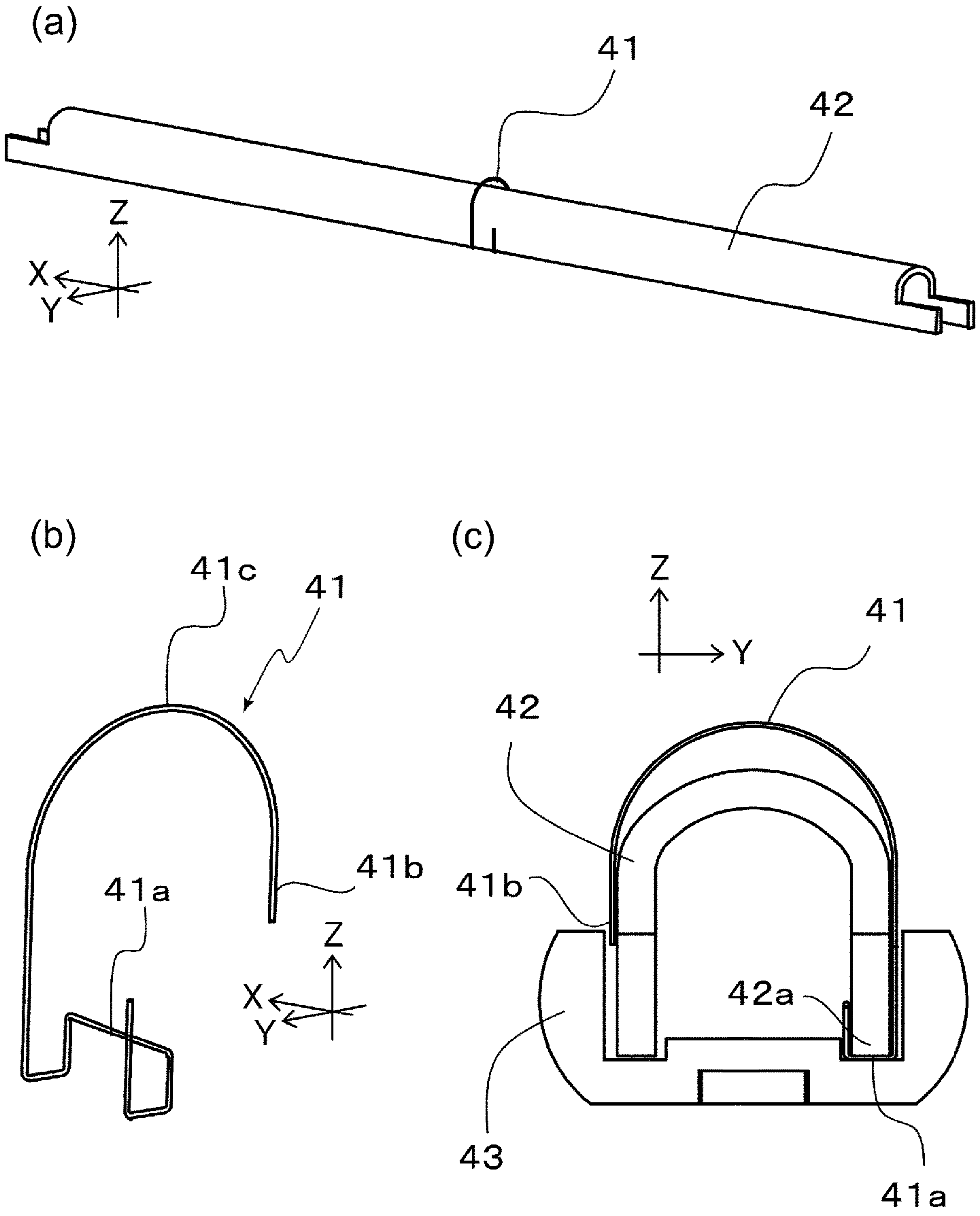

Part (a), part (b) and part (c) of FIG. 11 are views to illustrate a conductive wire according to a third embodiment.

Figure 12:
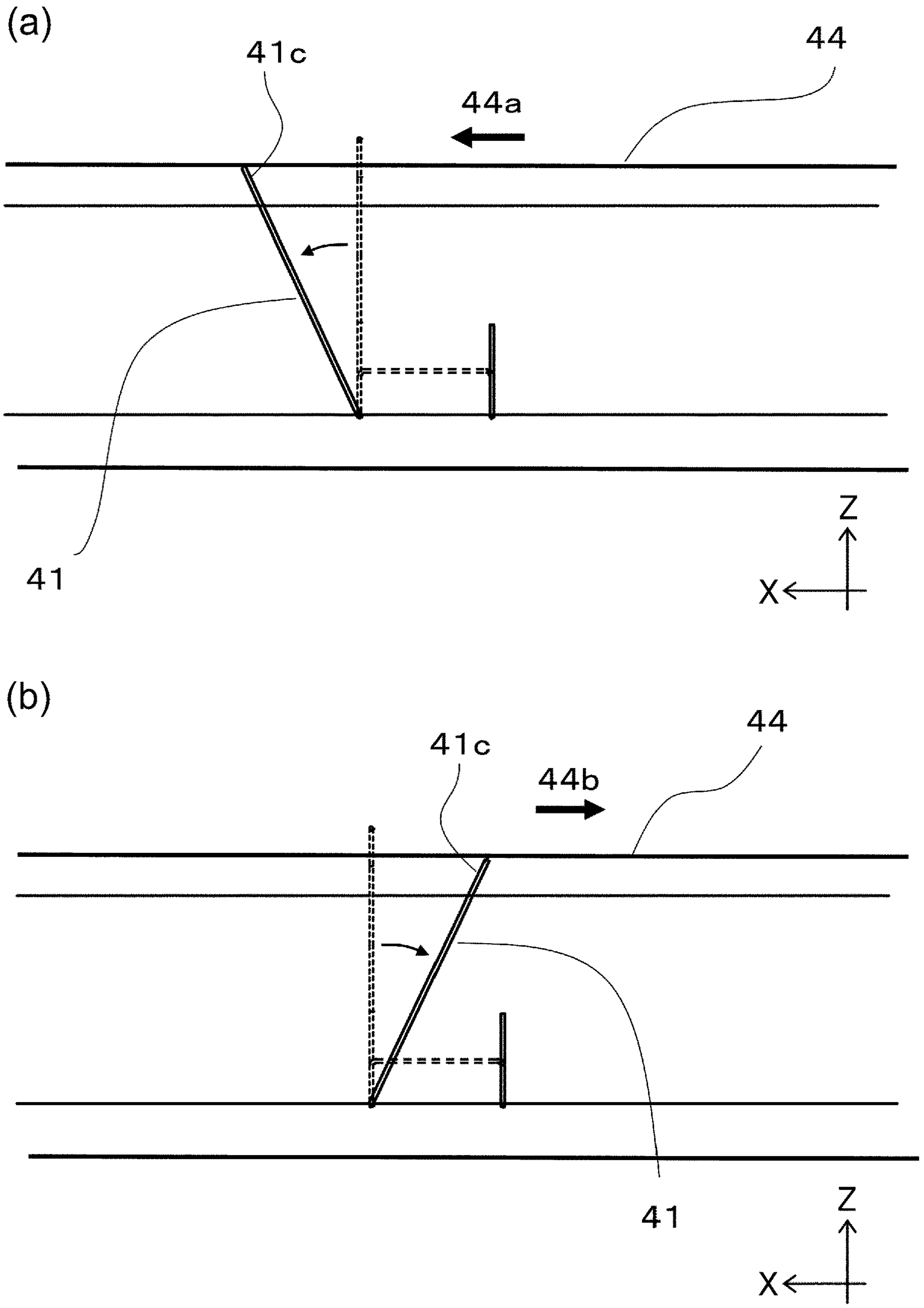

Part (a) and part (b) of FIG. 12 are views to illustrate the conductive wire according to the third embodiment.

Figure 13:
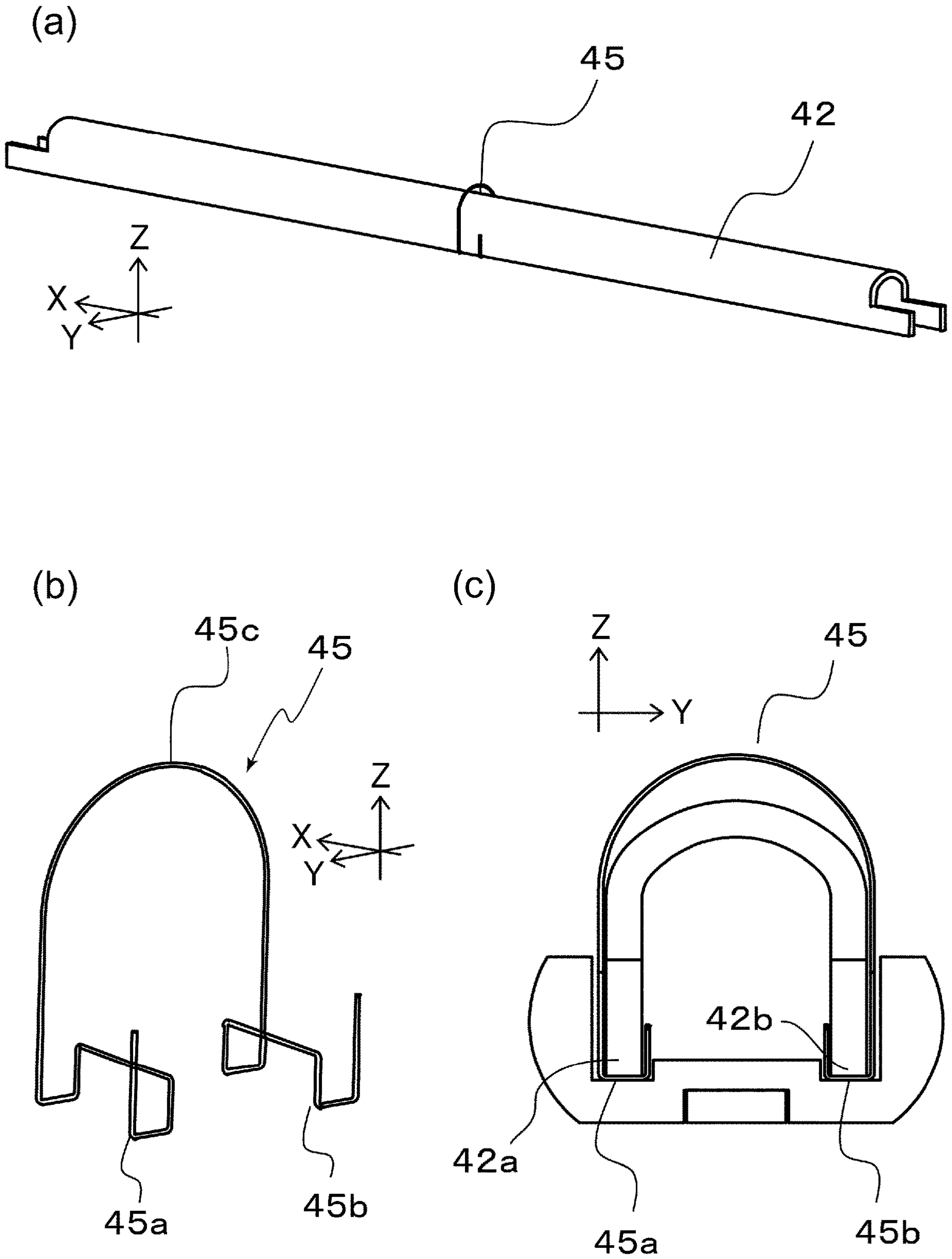

Part (a), part (b) and part (c) of FIG. 13 are views to illustrate a conductive wire according to a modified example.

DESCRIPTION OF THE EMBODIMENTS

In the following, embodiments of the present invention will be described with reference to Figures.

First Embodiment

Figure 1:
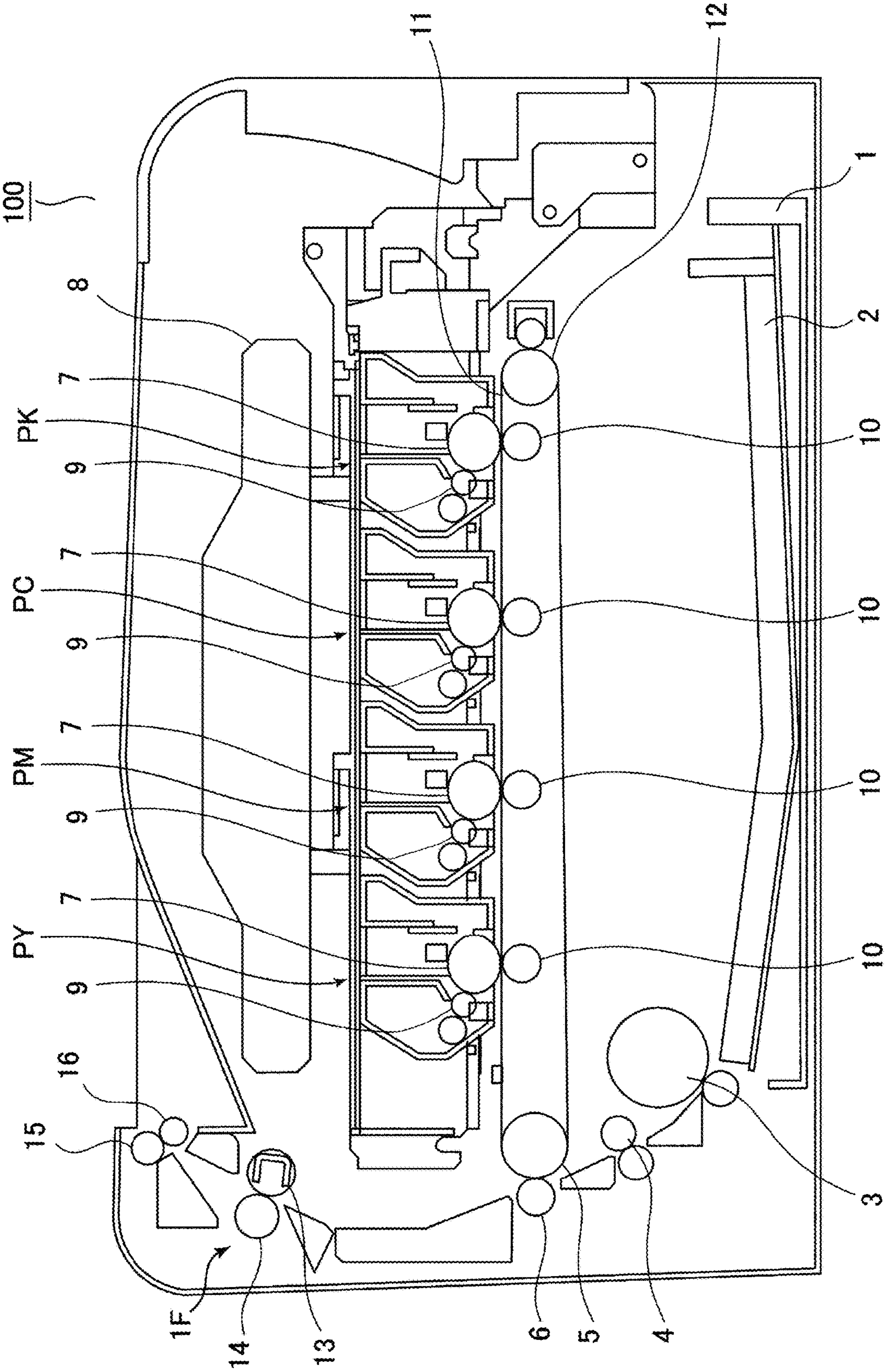
FIG. 1 is a schematic view showing an image forming apparatus according to a first embodiment of the present invention.

An overall configuration of an image forming apparatus 100 according to the first embodiment will be described with reference to FIG. 1. The image forming apparatus 100 is a full-color laser printer which is provided with an electrophotographic unit which includes four process units PY, PM, PC and PK as an image forming means.

Each process unit of PY, PM, PC and PK includes a photosensitive drum 7 as an image bearing member, a charger, a developing roller 9 as a developing means, a cleaning unit, etc. Further, each process unit of PY, PM, PC and PK accommodates toner as a developer. Each process unit of PY, PM, PC and PK is arranged along an intermediary transfer belt 11 as an intermediary transfer member. The intermediary transfer belt 11 is stretched by a driving roller 5 and a tension roller 12.

The image forming apparatus 100 executes an image forming operation to form an image on a recording material 2 based on image data which is received from an external source. When the image forming operation is started, the recording material 2 which is stacked and stored in a feeding tray 1 is fed one sheet by one sheet by a rotating feeding roller 3 and is conveyed by a conveying roller 4 toward a transfer portion (transfer nip) which is formed between a driving roller 5 and a secondary transfer roller 6.

In each process unit of PY, PM, PC and PK, the photosensitive drum 7 is rotationally driven, and a surface of the photosensitive drum 7 is uniformly charged by the charger. When the surface of the photosensitive drum 7 is exposed by a laser beam which is emitted from a laser scanner 8, an electrostatic latent image is formed on the surface of the photosensitive drum 7 according to the image data. The developing roller 9 develops the electrostatic latent image to make it into a toner image by supplying toner to the photosensitive drum 7. The toner image which is formed on the photosensitive drum 7 is transferred to the intermediary transfer belt 11 by a primary transfer roller 10. In a case of forming color images, the toner images of each color of yellow, magenta, cyan and black are developed on four of the photosensitive drums 7. And when the toner images of each color are transferred to the intermediary transfer belt 11 so that they overlap each other, a full-color toner image is formed on the intermediary transfer belt 11.

The toner image is borne on the intermediary transfer belt 11 and sent to the transfer portion, and the toner image is transferred to the recording material 2 by the secondary transfer roller 6. In this way, an unfixed image is formed on the recording material 2.

The recording material 2 on which the toner image is transferred is conveyed to a fixing device 1F. The fixing device 1F fixes the image by heating and pressing the toner image on the recording material 2 while conveying the recording material 2. The recording material 2 which is passed through the fixing device 1F is discharged outside of the image forming apparatus by a discharging unit which is comprised of a discharging roller 15 and a discharging roller 16.

(Fixing Device)

Figure 2:
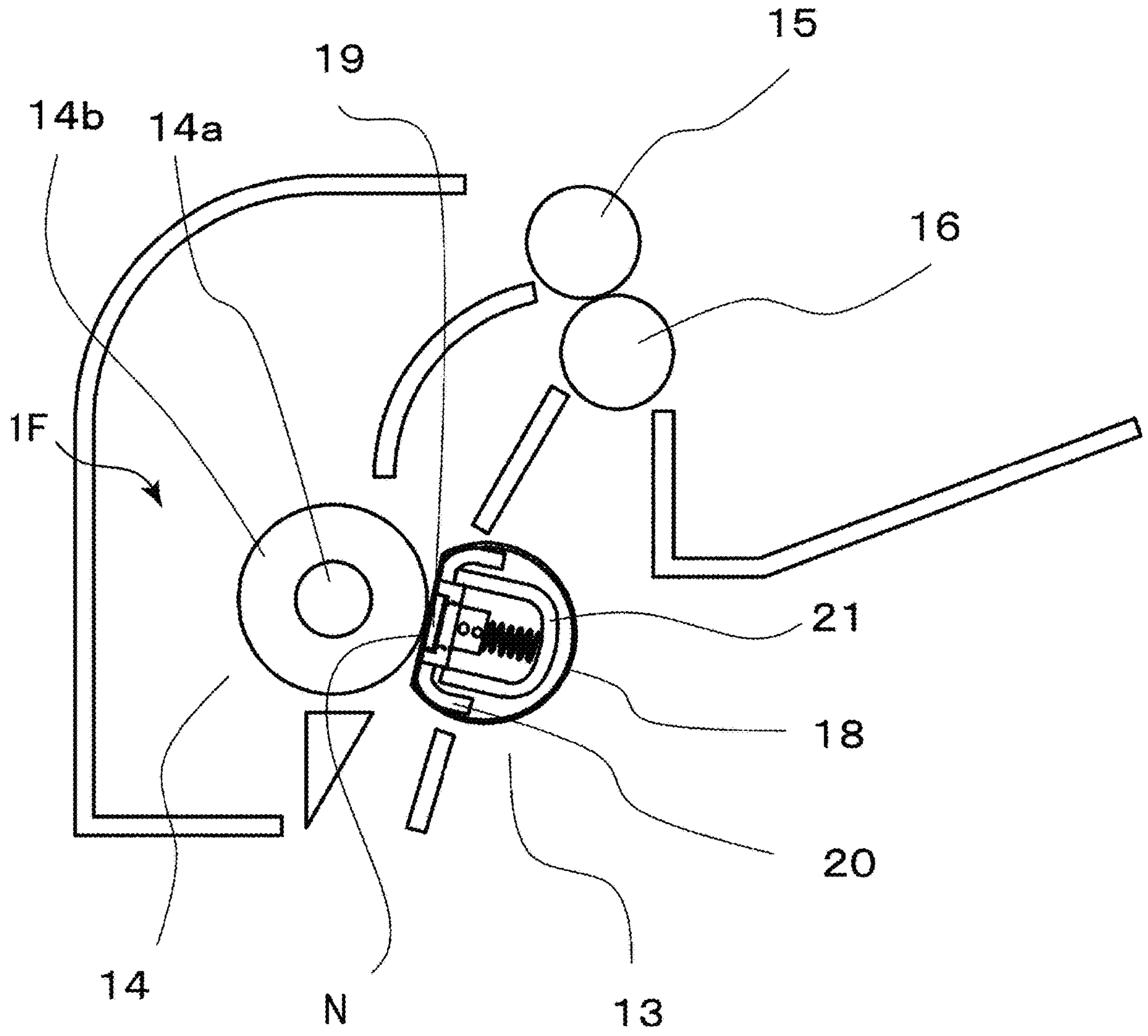
FIG. 2 is a schematic view showing a fixing device according to the first embodiment.

Next, the fixing device 1F according to the embodiment will be described. FIG. 2 is a schematic view of the fixing device 1F. The fixing device 1F includes a heating unit 13 and a pressing roller 14 as a pressing member and is a device (image heating device) which performs thermal fixing of an image while nipping and conveying the recording material 2 at a nip portion (fixing nip N) between the heating unit 13 and the pressing roller 14.

The heating unit 13 includes a fixing film 18, a heater 19 which contacts an inner surface of the fixing film 18, a holder 20 which holds the heater 19, and a metal stay 21 which supports the holder 20 and reinforces rigidity of the heating unit 13. The stay 21 is a reinforcing member which supports and reinforces the holder 20 (heater holder) which holds the heater 19, and is also a mounting member on which a conductive wire 28 which will be described below is mounted.

The fixing film 18 is an example of a cylindrical fixing member. The fixing film 18 is a film member which is formed with flexible resin or metal film. Abase layer which configures the inner surface of the fixing film 18 may be metal or conductive resin. Further, the fixing film 18 may include a release layer in which toner is hardly adhered on an outer peripheral side of the base layer. The fixing film 18 is, for example, a polyimide film which has high heat resistance and excellent thermal conductivity properties. Incidentally, the fixing member may be, for example, an endless film (fixing belt) which is stretched over a plurality of rollers.

The heater 19 is an example of a heating means which heats the fix member. The heater 19 is a ceramic heater, a carbon heater, etc. in which a pattern of a heat generating resistor which is formed on a board, and generates heat when it is energized by an unshown power source. The heater 19 is held in the holder while the heater is engaged in a groove portion of the holder 20. The holder 20 serves to guide a rotation locus of the fixing film 18 along with a flange member 26 and a flange member 27 which will be described below. The heater 19, the holder 20 and the stay 21 are arranged in an inner space of the fixing film 18.

The heater 19 and the holder 20 configure a nip forming unit which is arranged in the inner space of fixing film 18. In the embodiment, the heater 19 is configured to contact the inner surface of the fixing film 18, however, the nip forming unit may be provided with a sliding member which is interposed between the heater 19 and the fixing film 18. It is preferable that the sliding member is a member which has high sliding properties in which it slides on the inner surface of the fixing film 18 and high thermal conductivity, for example, a thin metal sheet such as aluminum may be used.

The heating unit 13 is abutted with the pressing roller 14 by an unshown pressing spring while nipping the fixing film 18. The pressing roller 14 includes a core metal 14*a* and a heat-resistant rubber layer 14*b* which is provided around the core metal 14*a*. Since the pressing roller 14 is elastic, when the heating unit 13 is pressed against the pressing roller 14 by force of the pressure spring, the fixing nip N of a predetermined width is formed as a contacting area between the heating unit 13 and the pressing roller 14 with respect to a direction of conveying the recording material.

The pressing roller 14 is rotationally driven by an unshown driving source. A frictional force between the fixing film 18 and the pressing roller 14 is generated by rotation of the pressing roller 14 and the fixing film 18 rotates following the pressing roller 14. When fixing an image, the fixing device 1F fixes the image on the recording material by heating the image (toner image) on the recording material with the fixing film 18 which is heated by heat (non-radiant heat) from the heater 19 while nipping and conveying the recording material 2 at the fixing nip N. The recording material 2 which exits the fixing nip N is separated from the fixing film 18 by curvature of the rotational locus of the fixing film 18 and rigidity of the recording material itself, and is conveyed to a downstream side of the fixing nip N.

In descriptions and figures which are described below, a direction from one side to the other side with respect to a direction of a rotational axis of the fixing film 18 and the pressing roller 14 is defined as a longitudinal direction of the fixing device 1F or simply "a longitudinal direction X". A direction which is perpendicular to the longitudinal direction X and a direction of conveying the recording material at the fixing nip N is defined as a short direction of the fixing device 1F or simply "a short direction Y". The longitudinal direction X is substantially parallel to a longitudinal direction of the heater 19 whose shape is a long and narrow plate, and the short direction Y is substantially parallel to a short direction of the heater 19. A direction which is perpendicular to both the longitudinal direction X and the short direction Y and a direction which is heading from a side of the pressing roller 14 toward a side of the heating unit 13 is defined as "a perpendicular direction Z". The perpendicular direction Z is a pressing direction in which the pressing roller 14 and the heating unit 13 press against each other at the fixing nip N. Further, as needed, a direction which is opposite to an arrow which is shown in the figure is indicated with a minus reference numeral such as "−X direction".

The heating unit 13 will be further described. Part (a) of FIG. 3 is a sectional view of the heating unit 13 when it is sectioned in a direction which is perpendicular to the longitudinal direction of the heating unit 13. Part (b) of FIG. 3 is a perspective view of the heating unit 13 when the fixing film 18 and the stay 21 are removed. As shown in part (a) and part (b) of FIG. 3, the heating unit 13 further includes a protection element 22, a temperature detection element 23, the flange member 26 and the flange member 27.

The protection element 22 functions as a switch which operates according to temperature of the heater 19 and has a role of cutting off power supply to the heater 19 in a case that the heater 19 is overheated. The protection element 22 is, for example, a thermal fuse. The protection element 22 is arranged to oppose a surface of an opposite side of the heater 19 from a surface which contacts the fixing film 18. Further, electrically, the protection element 22 is arranged in a middle of a power supply path to the heater 19.

The temperature detection element 23 is an element which emits a signal according to the temperature of the heater 19. A control portion of the image forming apparatus 100 is able to control an amount of heat generation of the heater 19 and execute temperature control to maintain temperature of the fixing nip N at a predetermined target temperature (fixing temperature) by controlling the power supply to the heater 19 based on the signal from the temperature detection element 23. The temperature detection element 23 is, for example, a thermistor.

Incidentally, in order to ensure stable operation of the protection element 22 and the temperature detection element 23, each of the elements is urged toward the heater 19 by a spring 24 and a spring 25, respectively.

The flange member 26 and the flange member 27 are provided at both end portions of the heating unit 13 with respect to the longitudinal direction. The flange member 26 and the flange member 27 include support portions 26*a* (only the flange member 26 is shown in part (a) of FIG. 5) which support the inner surface of the fixing film 18 and regulate its rotation locus. Further, the flange member 26 and the flange member 27 include regulating surfaces 26*b* (a flange portion, only the flange member 26 is shown in part (a) of FIG. 5) which extend from the support portions 26*a* in a radial direction, oppose edges of the fixing film 18 and regulate a position of the fixing film 18 with respect to the longitudinal direction.

(Conductive Wire)

Next, a conductive wire 28 as a conductive member which is provided with the heating unit 13 will be described. As shown in part (b) of FIG. 3, the conductive wire 28 is provided at an end portion of the heating unit 13 with respect to the longitudinal direction X and conducts the fixing film 18 to an electric circuit which will be described below by contacting the inner surface of the fixing film 18.

Part (a) of FIG. 4 is a perspective view of the conductive wire 28 and the stay 21. Part (b) of FIG. 4 is an enlarged view of a rectangle in part (a) of FIG. 4. Part (c) of FIG. 4 is a sectional view of the stay 21 as the mounting member on which the conductive wire 28 is mounted when the stay 21 is sectioned in a plane which is perpendicular to the longitudinal direction X. Incidentally, in the embodiment, it is described that the conductive wire is mounted on the stay 21, however, the conductive wire may be mounted on other members (for example, the holder 20, the flange member 26, etc.).

As shown in part (a), part (b) and part (c) of FIG. 4, the conductive wire 28 is held at one end portion of the stay 21 with respect to the longitudinal direction X. The conductive wire 28 includes a first end portion 28*a*, a second end portion 28*b*, a curved portion 28*c* and an extension portion 28*d*.

The curved portion 28*c* is a portion which contacts the inner surface of the fixing film 18. As shown in part (b) of FIG. 4, the curved portion 28*c* is curved so as to form a smooth curve which is convex toward an opposite side (upper side in the figure) of the fixing nip N with respect to the perpendicular direction Z when it is viewed in the longitudinal direction X. In other words, the curved portion 28*c* is curved in a U-shape which opens to a side of the nip portion N in the perpendicular direction Z when it is viewed in the longitudinal direction X. The curved portion 28*c* is formed, for example, in a shape of a circular arc (semicircular).

The extension portion 28*d* is a straight portion which is continuous to one end of the curved portion 28*c* and extends from the curved portion 28*c* toward a side of the flange member 26 along longitudinal direction X. The extension portion 28*d* extends to an outside with respect to the longitudinal direction X beyond the regulating surface 26*b* from the curved portion 28*c* which is arranged an inside of the regulating surface 26*b* of the flange member 26 with respect to a longitudinal direction in order to contact the inner surface of the fixing film 18. Therefore, it is possible to contact and conduct the conductive wire 28 with the other member (in the embodiment, a leaf spring 29 which will be described below) on an outside of the fixing film 18.

The first end portion 28*a* of the conductive wire 28 is a leading end portion of the extension portion 28*d*. The first end portion 28*a* is bent to engage a protrusion shaped engaging portion 21*a* which is provided with the stay 21. Specifically, the first end portion 28*a* is formed so as to nip the engaging portion 21*a* from both sides with respect to the longitudinal direction X. In this way, a position of the conductive wire 28 with respect to the longitudinal direction X is determined as the first end portion 28*a* is engaged with the engaging portion 21*a*. Further, the engaging portion 21*a* is a part of a protrusion of the stay 21 which protrudes with respect to the perpendicular direction Z (−Z direction) and a constricted portion so as to narrow a width of the protrusion with respect to the longitudinal direction X. As the first end portion 28*a* is engaged with the engaging portion 21*a* of such a shape, a position of the conductive wire 28 with respect to the perpendicular direction Z is determined. Furthermore, the first end portion 28*a* includes a hook portion 28*f* (see also part (b) of FIG. 5) which is formed so as to wrap around a back side of the stay 21 with respect to the short direction Y and oppose an inner surface 21*al* of the stay 21. In this way, it is possible to improve workability by preventing the first end portion 28*a* from falling out of the engaging portion 21*a* with respect to the short direction Y while the conductive wire 28 is mounted.

The second end portion 28*b* of the conductive wire 28 is an end portion which is an opposite side of the extension portion 28*d* of the curved portion 28*c* (part (b) of FIG. 4). The second end portion 28*b* is bent so as to oppose an inner surface 21*b*1 of the stay 21 with respect to the short direction Y by wrapping around a leading end 21*b* of the stay 21 which is U-shaped (substantially C-shaped open in the −Z direction) when it is viewed in the longitudinal direction X. The first end portion 28*a* and the second end 28*b* are engaged with the stay 21, respectively, so that the conductive wire rod 28 is temporarily held in the stay 21.

The conductive wire 28 is a wire work product (wire forming) in which a single metal wire is bent (including curved bend and right angle bend) by using a multi forming machine, etc. As for metal wire, steel wire whose Young's modulus is greater than or equal to 180 GPa and less than or equal to 210 GPa may be preferably used, however, other metal materials such as aluminum wire or copper wire may also be used.

In the embodiment, an entire wire, which includes a contact portion with the fixing member (the fixing film 18) and a held portion (the first end portion 28*a* and the second end portion 28*b*) which is held by a mounting member (the stay 21), is formed by a single wire. In this way, it is possible to reduce the number of parts, compared to a case in which the contact portion and the held portion are separate members, for example. Incidentally, attachments may be mounted on the conductive wire 28.

As shown in part (b) of FIG. 4, an opening width Y28 of the conductive wire 28 in a state that the conductive wire 28 is not mounted on the stay 21 (in a natural state that it is not elastically deformed) is set slightly narrower than a width Y21 of the stay 21 in the short direction Y The opening width Y28 is an opening width of the conducting wire material 28, in the short direction Y, which is curved to form a concave shape which is open to a side of the pressing roller 14 when it is viewed in the longitudinal direction X. The width Y21 of the stay 21 in the short direction Y is a distance between two side surfaces of the stay 21 (outer surfaces on both sides of the stay 21 in the short direction Y) which contact two end portions of the curved portion 28*c* of the conducting wire 28. Due to the establishment which is described above, it is possible to improve workability of assembling by preventing the conductive wire 28 from moving unexpectedly when the conductive wire 28 is temporarily held in the stay 21.

Further, a part of the second end portion 28*b* is inserted between the stay 21 (reinforcing member) and the holder 20 (heater holder, see a dashed line in part (c) of FIG. 4) when the stay 21 is assembled to the holder 20. In this way, it is possible to firmly hold the conductive wire 28 by using the holder 20.

A structure around the flange member 26 will be described below. Part (a) of FIG. 5 is an enlarged view of an area around the flange member 26 in part (b) of FIG. 3. Part (b) of FIG. 5 is a view showing a part of the flange member 26 when it is viewed from a side of the −Z direction (that is, in a direction of an arrow VB in part (a) of FIG. 5).

As shown in part (a) and part (b) of FIG. 5, the metal leaf spring 29 is mounted on the flange member 26 as a conductive portion to connect the conductive wire 28 to a circuit which is external to the heating unit 13. A leading end 29*b* of the leaf spring 29 is elastically deformable in the Y direction and is configured so as to press the engaging portion 21*a* of the stay 21 in the −Y direction while the stay 21 is mounted on the flange member 26. Therefore, the first end portion 28*a* of the conductive wire 28 is inserted between the leaf spring 29 and the stay 21 and conduction between the leaf spring 29 and the conductive wire 28 is secured.

The other end portion 29*a* of the leaf spring 29 is exposed to an outside of the flange member 26 (part (a) of FIG. 5). By contacting the end portion 29*a* to other conduction, it is possible to electrically connect to a circuit for controlling potential of the fixing film 18 via the conductive wire 28 and the leaf spring 29.

The fixing film 18 according to the embodiment is grounded by being connected to ground of the image forming apparatus 100 via the conductive wire 28, etc. The ground of the image forming apparatus 100 is a structure which serves as a reference for a potential of an electrical circuit of the image forming apparatus 100, and it is, for example, a metal frame which configures a casing of the image forming apparatus 100.

FIG. 6 shows an electrical circuit diagram between the fixing film 18 and ground GND according to the embodiment. As described above, the fixing film 18 is conductive to the conductive wire 28 and the conductive wire 28 is connected to the circuit which is external to the heating unit 13 via the leaf spring 29 which is described above. In the embodiment, the leaf spring 29 is connected to a resistor 30, and furthermore, the resistor 30 is connected to the ground GND via a diode 31 and a capacitor 32 which are arranged in parallel.

The resistor 30, the diode 31 and the capacitor 32 are examples of electric elements, and other elements (for example, a varistor) may be used. Further, a circuit configuration between the conductive wire 28 and the ground GND is not limited to the configuration which is shown in the figure.

By connecting the fixing film 18 to the ground GND via an appropriate electric element, it is possible to reduce possibility of causing a transfer defect by excessive charging of the fixing film 37, as will be described below.

(Conductive Wire when Film is Inserted)

Next, deformation of the conductive wire 28 when the film is inserted will be described. FIG. 7 is a perspective view showing a state while the fixing film 18 is inserted (externally fitted) into the stay 21. Part (a) and part (b) of FIG. 8 are schematic diagrams of an area around the conductive wire 28 when it is viewed from the short direction Y, and part (a) of FIG. 8 shows a state before the fixing film 18 is inserted and part (b) of FIG. 8 shows a state after the fixing film 18 is inserted.

As shown in FIG. 7, the fixing film 18 is assembled as a part of the heating unit 13 by being inserted into the stay 21 from a side (−X direction side) in which the conductive wire 28 is provided with respect to the longitudinal direction X toward the other side (arrow 18*a*).

As shown in part (a) and part (b) of FIG. 8, the conductive wire 28 is arranged so that when the fixing film 18 is inserted it contacts the inner surface of the fixing film 18 near a vertex of the curved portion 28*c* and is deformed since it is pressed by the fixing film 18. That is, the conductive wire 28 is elastically deformed so that the curved portion 28*c* is inclined toward the longitudinal direction X (inserting direction of the fixing film 18) in a state after the fixing film 18 is mounted (part (b) of FIG. 8) with reference to a state before the fixing film 18 is mounted (part (a) of FIG. 8).

It is possible to certainly contact the conductive wire 28 with the fixing film 18 and secure conduction by becoming a state that the conductive wire 28 is elastically deformed by inserting the fixing film 18.

Further, when the conductive wire 28 contacts the inner surface of the fixing film 18 in the curved portion 28*c*, it is possible to reduce possibility that an edge or a bent portion (right angle portion) of the conductive wire 28 will damage the fixing film 18.

Contact pressure of the curved portion 28*c* against the inner surface of the fixing film 18 is preferably set at approximately 5 gf (50 mN), and it is set at, for example, less than or equal to 10 gf (less than or equal to 100 mN). It is possible to further reduce the possibility that the conductive wire 28 will damage the fixing film 18 by reducing the contact pressure.

Incidentally, a contact position X1 (part (b) of FIG. 8) of the conductive wire 28 with respect to the fixing film 18 may be inside a sheet passing region of the fixing nip N or outside the sheet passing region. The contact position X1 is a vertex position of the curved portion 28*c*. "Sheet passing region" is a passing region in which the recording material of a maximum size (maximum width of the recording material with respect to the longitudinal direction X), that the fixing device 1F is possible to fix an image, passes through the fixing nip N Since heat capacity of the conductive wire 28 is small, it is less likely to cause temperature changes of the fixing film 18 at the contact position X1 (part (b) of FIG. 8). Therefore, even when the conductive wire 28 is arranged so that the contact position X1 is inside the sheet passing region, there is little possibility that uneven gloss of the fixed image is caused. On the other hand, it is possible to further reduce possibility that the conductive wire 28 will affect fixation property of the image by arranging the conductive wire 28 so that the contact position X1 is outside the sheet passing region.

(Effects of Conductive Wire)

By using the conductive wire 28, following effects are obtained. The fixing film 18 may be charged due to separation discharge, etc. when the recording material passes through the fixing nip N. In a case that the image is formed on the recording material in which its resistance value is decreased since it is left in a high humidity environment for a long time while the fixing film 18 is charged, it may cause a transfer defect by flowing current from the fixing film 18 to the transfer portion through the recording material when the leading end of the recording material reaches the fixing nip N. According to the embodiment, it is possible to suppress excessive charging of the fixing film 18 and suppress the occurrence of the transfer defect by grounding the fixing film 18 via the conductive wire 28.

Further, the conductive wire 28 according to the embodiment is elastically deformed when the fixing film 18 is inserted, as described by using part (a) and part (b) of FIG. 8. Therefore, it is possible to reduce the possibility that the fixing film 18 will be damaged by the conductive member at a time of inserting the fixing film 18, compared to a case that a high rigidity metal plate is used as the conductive member, for example. Further, the inner surface of the fixing film 18 may not be damaged by an edge of the metal plate.

In this way, according to the embodiment, it is possible to provide a configuration in which it is possible to reduce the possibility that the fixing member will be damaged.

Further, there is no need to insert the fixing film 18 while pushing down (bending) a metal plate as a conductive member, for example, in order to avoid contact with the fixing film 18, since the conductive wire 28 is elastically deformed at a time of inserting the fixing film 18. Therefore, it is possible to improve workability of an assembly process.

Further, it is possible to reduce the possibility that the inner surface of the fixing film 18 will be damaged by an end portion of the conductive wire 28 since the conductive wire 28 is configured so as to contact the inner surface of the fixing film 18 at the curved portion 28*c* as in the embodiment.

Further, it is possible to reduce the number of parts since the conductive member which is formed of the wire is used in the embodiment, compared to a conductive member in which a metal plate and a contact portion of a carbon chip are put together as in a conventional example.

Further, in a case that a metal plate is used as a conductive member, since heat capacity of the metal plate is relatively large, uneven gloss of the fixed image may be occurred by occurring uneven temperature of the fixing film 18 in a contact portion with the conductive member, depending on conditions such as a position of the metal plate and the amount of the heat generation of the heater. Since the heat capacity of the conductive wire 28 according to the embodiment is very low, uneven temperature of the fixing film 18 is not easily occurred. That is, it is possible to reduce the possibility that the conductive wire 28 will affect the fixation property of the image.

Further, the conductive wire 28 which is made of the wire has a high degree of freedom of shape, it is possible to configure in a small space, and it is possible to miniaturize the fixing device 1F.

Second Embodiment

A fixing device 2F according to the second embodiment will be described by using FIG. 9 and part (a) and part (b) of FIG. 10. The fixing device 2F according to the embodiment is different from the fixing device 1F according to the first embodiment in that it uses a halogen heater as a heating means. It is possible to use the fixing device 2F in place of the fixing device 1F in the same image forming apparatus 100 as in the first embodiment. Hereinafter, an element in which a common reference numeral with the first embodiment is attached is assumed to have substantially the same configuration and the same effect as those described in the first embodiment, and parts which are different from those in the first embodiment will be mainly described.

FIG. 9 is a sectional view of the fixing device 2F according to the embodiment, when it is cut in a plane which is perpendicular to the longitudinal direction X. Part (a) of FIG. 10 is a perspective view of the fixing device 2F, and part (b) of FIG. 10 a perspective view of a part of the fixing device 2F in order to illustrate the conductive wire 40 according to the embodiment.

As shown in FIG. 9, the fixing device 2F includes a heating unit which includes a halogen heater 33, the fixing film 37, a nip forming plate 38, a stay 34 and a reflecting plate 36, and a pressing roller 35 as a pressing member. The halogen heater 33 is an example of a heating means, and the fixing film 37 is an example of a fixing member. The halogen heater 33 is an example of a heater which emits radiant heat.

The fixing film 37 is possible to be the same configuration as the fixing film 18 according to the first embodiment. The halogen heater 33 is arranged in an inner space of the fixing film 37. The halogen heaters 33 generates the radiant heat when current is supplied from an unshown power source.

The nip forming plate 38 slides with an inner surface of the fixing film 37 and opposes the pressing roller 35 while nipping the fixing film 37. The stay 34 supports the nip forming plate 38 from an opposite side of a sliding surface with the fixing film 37. The reflecting plate 36 is mounted so as to cover an opposite side of the stay 34 from the nip forming plate 38 and increases heating efficiency of the fixing film 37 by reflecting the radiant heat which transfers from the halogen heater 33 toward the stay 34.

As shown in part (a) of FIG. 10, the halogen heater 33, the stay 34 and the nip forming plate 38 are fixed to a heater holder 39. The heater holder 39 is formed in a U-shape that both ends of a center portion which extends in the longitudinal direction X are bent in the perpendicular direction Z, and both end portions of the halogen heater 33, etc. are fixed to side plates of both end portions of the heater holder 39. Further, when the heater holder 39 is urged toward a side of the pressing roller 35 by an unshown spring, the fixing nip N is formed between the nip forming plate 38 as a nip forming member and the pressing roller 35.

The fixing device 2F according to the embodiment fixes the image by heating the toner on the recording material by the fixing film 37 which is heated by the radiant heat from the halogen heater 33 while nipping and conveying the recording material between the fixing film 37 and the pressing roller 35 in the fixing nip N.

As shown in part (b) of FIG. 10, inside the fixing film 37, the conductive wire 40 as a conductive member is arranged so as to contact the inner surface of the fixing film 37. A configuration of the conductive wire 40 may be same as the conductive wire 28 according to the first embodiment.

The fixing film 37 is connected to a circuit for controlling potential of the fixing film 37 via the conductive wire 40. For example, the fixing film 37 is connected to ground of the image forming apparatus via the conductive wire 40 and an unshown electrical element (see FIG. 6). In this way, it is possible to reduce possibility that excessive charging of the fixing film 37 will cause a transfer defect.

In the embodiment, it is also possible to obtain same advantages as in first embodiment by mounting the conductive wire 40 on the stay 34 and contacting the inner surface of fixing film 37.

Further, in a case of a configuration which heats the fixing film 37 by using the radiant heat such as the halogen heater 33, when a metal plate is arranged as a conductive member, there is a concern that uneven temperature of the fixing film 37 may be occurred since the metal plate may block the radiant heat. By using a wire whose projected area is small as a conductive member, it is possible to make it more difficult to occur uneven temperature of the fixing film 18.

Third Embodiment

A configuration according to the third embodiment will be described by using part (a), part (b) and part (c) of FIG. 11, and part (a) and part (b) of FIG. 12. The embodiment is different from the first embodiment in a configuration of the conductive wire as the conductive member. Each conductive wire may be used in place of, for example, the conductive wire 28 or the conductive wire 40 of the first embodiment or the second embodiment. Hereinafter, an element in which a common reference numeral with the first embodiment is attached is assumed to have substantially the same configuration and the same effect as those described in the first embodiment, and parts which are different from those in the first embodiment will be mainly described.

Part (a) of FIG. 11 is a perspective view of a metal stay 42 as a reinforcing member on which a conductive wire 41 according to the embodiment is mounted. The metal stay 42 is formed of a metal such as stainless steel, that is, a conductor. Part (b) of FIG. 11 is a perspective view of the conductive wire 41. Part (c) of FIG. 11 is a sectional view of a unit which combines a metal stay 42 on which the conductive wire 41 is mounted and a holder 43, when the unit is cut in a plane which is perpendicular to the longitudinal direction X.

Incidentally, the holder 43 holds a heater such as a ceramic heater similarly to the first embodiment. However, the conductive wire 41 according to the embodiment may be applied to the fixing device 2F which is provided with the halogen heater according to the second embodiment.

As shown in part (a) of FIG. 11, the conductive wire 41 is mounted on a center portion of the metal stay 42 with respect to the longitudinal direction. As shown in part (b) of FIG. 11, the conductive wire 41 includes a first end portion 41*a* as a held portion which is held by the metal stay 42, a second end portion 41*b* which is an opposite end of the first end portion 41*a*, and a curved portion 41*c* as a contact portion with a fixing film.

The first end portion 41*a* of the conductive wire 41 is bent so as to wrap around a leading end 42*a* of the metal stay 42 which is U-shaped in a sectional view as shown in part (c) of FIG. 11. The first end portion 41*a* of the conductive wire 41 is inserted in between the metal stay 42 and the holder 43, so the conductive wire 41 is conductive to the metal stay 42. The metal stay 42 is connected to ground via an unshown electrical element. In this way, it is possible to reduce possibility that excessive charging of the fixing film 44 will cause a transfer defect similarly to the first embodiment and the second embodiment.

Incidentally, the second end portion 41*a* is a free end which is not held by the metal stay 42. It may be a configuration which is possible to temporarily hold by making an opening width of the curved portion 41*c* to be slightly narrower than a short width of the metal stay 42 as in the first embodiment.

Part (a) of FIG. 12 is a schematic diagram showing deformation of the conductive wire 41 when the fixing film 44 is inserted (externally fitted) into the metal stay 42. As shown in part (a) of FIG. 12, the conductive wire 41 is arranged so that it is pressed by the fixing film 44 and deformed when the fixing film 44 is inserted. That is, the conductive wire 41 is elastically deformed so that the curved portion 41*c* leans toward the longitudinal direction X (inserting direction of the fixing film 44) in a state (solid line) after the fixing film 44 is mounted based on a state before the fixing film 44 is mounted (dashed line).

In part (a) of FIG. 12, a case in which the fixing film 44 is inserted from one side with respect to the longitudinal direction X toward a direction of an arrow 44*a* is illustrated, however, as shown in part (b) of FIG. 12, the fixing film 44 may be inserted from the other side with respect to the longitudinal direction X toward a direction of an arrow 44*b*. In this case, when the fixing film 44 is inserted, the conductive wire 41 is elastically deformed so that it leans toward the opposite side of an example in part (a) of FIG. 12.

In each case in part (a) and part (b) of FIG. 12, by the elastic deformation of the conductive wire 41, the curved portion 41*c* conducts more securely to the inner surface of the fixing film 44.

Advantage in the Embodiment

In the embodiment, the conductive wire 41, which is conductive to the fixing film 44, is connected to an external circuit via the metal stay 42. In the first embodiment, it is desirable to arrange the conductive wire 41 at an end portion of the heating unit 13 with respect to the longitudinal direction in order to reduce length of the conductive wire 41, however, in the embodiment such restrictions on the arrangement will not be occurred. For example, by contacting the conductive wire 41 with a center portion (center of sheet passing region) of the fixing film 44 with respect to the longitudinal direction, a potential distribution of the fixing film 44 may be symmetrical with respect to the longitudinal direction. However, it is not necessary to arrange the conductive wire 41 at a center position with respect to the longitudinal direction.

MODIFIED EXAMPLE

A modified example of the third embodiment will be described by using part (a), part (b) and part (c) of FIG. 13. Part (a) of FIG. 13 is a perspective view of the metal stay 42 on which a conductive wire 45 according to the modified example is mounted. Part (b) of FIG. 13 is a perspective view of the conductive wire 45. Part (c) of FIG. 13 is a sectional view of a unit which combines the metal stay 42 on which the conductive wire 45 is mounted and the holder 43, when the unit is cut in a plane which is perpendicular to the longitudinal direction X.

As shown in part (a), part (b) and part (c) of FIG. 13, the conductive wire 45 includes a first end portion 45*a* and a second end portion 45*b* as held portions which are held by the metal stay 42 respectively, and a curved portion 45*c* as a contact portion with a fixing film. The first end portion 45*a* and the second end portion 45*b* are bent so as to wrap around the leading end 42*a* and the leading end 42*b* of the metal stay 42 which is U-shaped in a sectional view. The first end portion 45*a* and the second end portion 45*b* of the conductive wire 45 are inserted in between the metal stay 42 and the holder 43, so the conductive wire 45 is conductive to the metal stay 42.

In this way, it is possible to conduct the conductive wire to the metal stay 42 more securely since the conductive wire 45 contacts the metal stay 42 at a plurality of contacts.

OTHER EMBODIMENTS

In each of the embodiments which are described above, the configurations in which it is possible to reduce the possibility that the excessive charging of the fixing film will cause the transfer defect at the transfer portion by providing the conductive wire which contacts the inner surface of the fixing film. However, negative effects which are caused by the charging of the fixing film are not limited to the transfer defect. For example, when a surface of the fixing film is charged with a polarity which is opposite to a normal charging polarity of the toner with reference to surface potential of the pressing member, part of the toner is adsorbed on the fixing film and may cause an image defect (electrostatic offset) due to adhesion to the recording material after one rotation of the fixing film. In this case, it is also possible to suppress the occurrence of the electrostatic offset since the fixing film is connected to the external circuit by the conductive member and the potential of the fixing film is controlled so as to be the same polarity as the normal charging polarity of the toner.

Incidentally, the circuit for controlling the potential of the fixing film is not limited to a passive one which removes the charge of the fixing film, however, it may be a voltage applying circuit which maintains the potential of the fixing film within a certain range by applying a predetermined bias voltage to the fixing film.

In addition to the above, the excessive charging of the fixing film may cause degradation of image quality due to scattering of unfixed toner and electromagnetic noise due to electrical discharge inside the apparatus. Even in this case, it is possible to control the potential of the fixing film within a desired range by connecting the fixing film to the electrical circuit using the conductive member of the present disclosure.

Further, in each of the embodiments which are described above, an electrophotographic unit, which applies an intermediary transfer method, is described, however, the image forming apparatus 100 may be provided with an electrophotographic unit which applies a direct transfer method as an image forming means. A configuration of the direct transfer method is a configuration in which a toner image which is formed on an image bearing member is transferred from the image bearing member to the recording material without an intermediate transfer member. Further, the electrophotographic unit may form a single color image by using only one type of toner.

Further, "image forming apparatus" is not limited to single function printers, but includes copiers, multifunction printers, printing machines for commercial use, etc.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-138176 filed on Aug. 31, 2022, which is hereby incorporated by reference herein in its entirety.

What is claimed is:

1. A fixing device comprising:

a cylindrical fixing member;

a heater arranged in an inner space of the fixing member;

a pressing member configured to contact the fixing member;

a conductive member disposed so as to contact an inner surface of the fixing member and configured to conduct the fixing member to a circuit for controlling a potential of the fixing member; and a mounting member on which the conductive member is mounted, wherein the fixing member heats an image on a recording material to fix the image onto the recording material while nipping and conveying the recording material between the fixing member and the pressing member, wherein the conductive member is formed of metal wire, wherein the conductive member includes a held portion held by the mounting member and formed on an end of the metal wire, and contacting portion for contacting the inner surface of the fixing member, and wherein the conductive member is elastically deformed in a rotational axis direction of the fixing member by contacting the fixing member.

2. A fixing device according to claim 1, wherein as viewed in a rotational axis direction of the fixing member, the conductive member includes a curved portion curved along the inner surface of the fixing member, and contacts the inner surface of the fixing member in the curved portion.

3. A fixing device according to claim 2, wherein as viewed in the rotational axis direction of the fixing member, the curved portion is curved in a circular arc.

4. A fixing device according to claim 1, wherein as viewed in a rotational axis direction of the fixing member, the conductive member includes a curved portion curved along the inner surface of the fixing member, the contacting portion is a part of the curved portion.

5. A fixing device according to claim 1, wherein the held portion and the contacting portion are formed of one of the metal wire.

6. A fixing device according to claim 1, further comprising a heater holder configured to hold the heater, wherein the mounting member is a reinforcing member configured to support the heater holder and reinforce the heater holder.

7. A fixing device according to claim 6, wherein the reinforcing member is a conductor, and wherein the conducting member is conducted to the circuit through the reinforcing member.

8. A fixing device according to claim 1, wherein the conductive member is grounded through the circuit.

9. A fixing device according to claim 1, wherein the conductive member contacts the fixing member in a position inside of a passing through area where the recording material passes through a nip portion between the fixing member and the pressing member with respect to a rotational axis direction of the fixing member.

10. A fixing device according to claim 1, wherein the fixing member includes a film member, wherein the heater is disposed in an internal space of the film member and provided with a heat generating resistor for generating heat by being energized, wherein a nip portion is formed by the heater and the pressing member through the film member, and wherein the fixing device heats the image in the nip portion by the film member heated by heat conduction from the heater.

11. A fixing device according to claim 1, wherein the fixing member includes a film member, wherein the heater is disposed in an internal space of the film member and generates radiant heat, and wherein the fixing device heats the image by the film member heated by the radiant heat of the heater.

12. An image forming apparatus comprising:

an image forming unit configured to form an image on a recording material; and a fixing device according to claim 1 configured to fix the image onto the recording material.

13. A fixing device comprising:

a cylindrical fixing member;

a heater arranged in an inner space of the fixing member;

a pressing member configured to contact the fixing member;

a conductive member disposed so as to contact an inner surface of the fixing member and configured to conduct the fixing member to a circuit for controlling a potential of the fixing member; and a mounting member on which the conductive member is mounted, wherein the fixing member heats an image on a recording material to fix the image onto the recording material while nipping and conveying the recording material between the fixing member and the pressing member, wherein the conductive member is formed of metal wire, wherein the conductive member includes a held portion held by the mounting member and formed on an end of the metal wire, and contacting portion for contacting the inner surface of the fixing member, wherein as viewed in a rotational axis direction of the fixing member, the conductive member is curved so as to draw a concave shape opened to a side of the pressing member, and wherein in a state in which the conductive member is not mounted on the mounting member, an open width of the conductive member with respect to a conveyance direction of the recording material in a nip portion between the fixing member and the pressing member is narrower than a width of the mounting member in the conveyance direction.

14. A fixing device comprising:

a cylindrical fixing member;

a heater arranged in an inner space of the fixing member;

a pressing member configured to contact the fixing member;

a conductive member disposed so as to contact an inner surface of the fixing member and configured to conduct the fixing member to a circuit for controlling a potential of the fixing member;

a mounting member on which the conductive member is mounted; and a heater holder configured to hold the heater, wherein the fixing member heats an image on a recording material to fix the image onto the recording material while nipping and conveying the recording material between the fixing member and the pressing member, wherein the conductive member is formed of metal wire, wherein the conductive member includes a held portion held by the mounting member and formed on an end of the metal wire, and contacting portion for contacting the inner surface of the fixing member, wherein the mounting member is a reinforcing member configured to support the heater holder and reinforce the heater holder, and wherein a part of the held portion is nipped between the reinforcing member and the heater holder.

15. A fixing device comprising:

a cylindrical fixing member;

a heater arranged in an inner space of the fixing member;

a pressing member configured to contact the fixing member;

a conductive member disposed so as to contact an inner surface of the fixing member and configured to conduct the fixing member to a circuit for controlling a potential of the fixing member;

a mounting member on which the conductive member is mounted;

a heater holder configured to hold the heater; and a flange member mounted on an end portion of the reinforcing member with respect to a rotational axis direction of the fixing member, and configured to regulate an end portion of the fixing member, wherein the fixing member heats an image on a recording material to fix the image onto the recording material while nipping and conveying the recording material between the fixing member and the pressing member, wherein the conductive member is formed of metal wire, wherein the conductive member includes a held portion held by the mounting member and formed on an end of the metal wire, and contacting portion for contacting the inner surface of the fixing member, wherein the mounting member is a reinforcing member configured to support the heater holder and reinforce the heater holder, and wherein the conducting member is conducted to the circuit through a conductive portion provided on the flange member.

16. A fixing device according to claim 15, wherein the conductive portion includes a leaf spring, and wherein the conductive member and the leaf spring are conducted by a part of the conducting member being nipped between the reinforcing member and the leaf spring.

17. A fixing device comprising:

a cylindrical fixing member;

a heater arranged in an inner space of the fixing member;

a pressing member configured to contact the fixing member; and a conductive member disposed so as to contact an inner surface of the fixing member and configured to conduct the fixing member to a circuit for controlling a potential of the fixing member, wherein the fixing member heats an image on a recording material to fix the image onto the recording material while nipping and conveying the recording material between the fixing member and the pressing member, wherein the conductive member is formed of metal wire, and wherein the metal wire is a steel wire of which Young's modulus is 180 GPa or more and 210 GPa or less.

18. A fixing device comprising:

a cylindrical fixing member;

a heater arranged in an inner space of the fixing member;

a pressing member configured to contact the fixing member; and a conductive member disposed so as to contact an inner surface of the fixing member and configured to conduct the fixing member to a circuit for controlling a potential of the fixing member, wherein the fixing member heats an image on a recording material to fix the image onto the recording material while nipping and conveying the recording material between the fixing member and the pressing member, wherein the conductive member is formed of metal wire, and wherein the conductive member contacts the fixing member in a position outside of a passing through area where the recording material passes through a nip portion between the fixing member and the pressing member with respect to a rotational axis direction of the fixing member.

* * * * *